United States Patent
Moser et al.

(10) Patent No.: US 6,873,891 B2
(45) Date of Patent: Mar. 29, 2005

(54) METHOD AND DEVICE FOR CO-ORDINATING MULTIPLE DRIVING SYSTEM DEVICES OF A VEHICLE

(75) Inventors: Martin Moser, Fellbach (DE); Reinhold Schneckenburger, Rutesheim (DE)

(73) Assignee: DaimlerChrysler AG, Stuttgart (DE)

( * ) Notice: Subject to any disclaimer, the term of this patent is extended or adjusted under 35 U.S.C. 154(b) by 25 days.

(21) Appl. No.: 10/296,386

(22) PCT Filed: May 10, 2001

(86) PCT No.: PCT/EP01/05341
§ 371 (c)(1),
(2), (4) Date: Mar. 27, 2003

(87) PCT Pub. No.: WO01/89898
PCT Pub. Date: Nov. 29, 2001

(65) Prior Publication Data
US 2003/0171865 A1 Sep. 11, 2003

(30) Foreign Application Priority Data
May 23, 2000 (DE) .......................................... 100 25 493

(51) Int. Cl.$^7$ .......................... B60R 22/00; E05F 15/00; G05D 1/00
(52) U.S. Cl. ............................ 701/48; 701/33; 701/36; 701/38; 701/74; 701/82; 701/91
(58) Field of Search .............................. 701/48, 33, 36, 701/38, 74, 82, 91

(56) References Cited

U.S. PATENT DOCUMENTS

| | | | | |
|---|---|---|---|---|
| 5,351,776 A | | 10/1994 | Keller et al. ............... | 180/79.1 |
| 5,369,584 A | * | 11/1994 | Kajiwara ....................... | 701/48 |
| 5,508,923 A | | 4/1996 | Ibamoto et al. | |
| 5,941,925 A | * | 8/1999 | Hess et al. ..................... | 701/91 |
| 6,263,262 B1 | * | 7/2001 | Bitzer et al. ................... | 701/1 |
| 6,272,418 B1 | * | 8/2001 | Shinmura et al. ............. | 701/72 |
| 6,343,249 B1 | * | 1/2002 | Sakai et al. ................... | 701/48 |
| 6,389,350 B1 | * | 5/2002 | Fennel ........................ | 701/91 |
| 6,622,074 B1 | * | 9/2003 | Coelingh et al. ............. | 701/48 |

FOREIGN PATENT DOCUMENTS

| | | |
|---|---|---|
| DE | 4201146 | 4/1995 |
| DE | 4209150 | 4/1995 |
| DE | 4305155 | 10/1995 |
| DE | 19600734 | 7/1997 |
| DE | 19700353 | 7/1998 |
| DE | 19704841 | 3/2002 |

OTHER PUBLICATIONS

Roger D. Fruechte, et al., "Integrated Vehicle Control" 39$^{th}$ IEEE Vehicular Technology Conference, vol. II, May 1989.

\* cited by examiner

*Primary Examiner*—Thomas G. Black
*Assistant Examiner*—Brian J Broadhead
(74) *Attorney, Agent, or Firm*—Crowell & Moring LLP

(57) ABSTRACT

The invention relates to a method and a device for coordinating multiple driving system devices of a vehicle by means of a co-ordination device. The driving system devices produce output signals according to the current driving state of the vehicle. In the coordination device, a result control signal is produced from the output signals and is used as a standard set value for directly influencing the driving state by means of the actuator devices of the vehicle and/or a parameter result signal is produced and used for influencing the regulating and/or control parameters of a driving state regulating system or driving state control system.

33 Claims, 1 Drawing Sheet

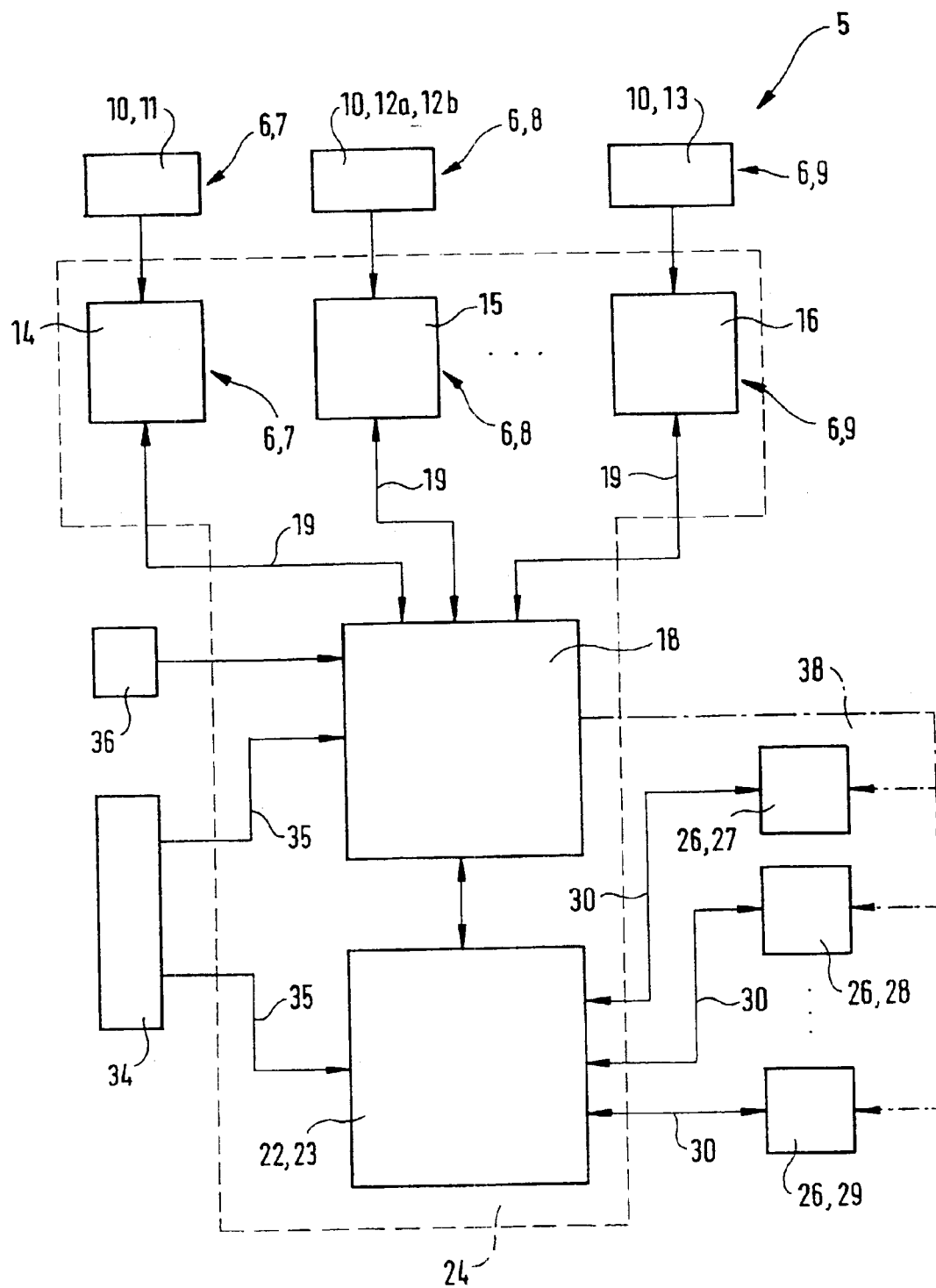

METHOD AND DEVICE FOR CO-ORDINATING MULTIPLE DRIVING SYSTEM DEVICES OF A VEHICLE

BACKGROUND AND SUMMARY OF THE INVENTION

The invention relates to a method and a device for coordinating a plurality of driving system devices of a vehicle.

Such a driving system device is, for example, a device for regulating the distance between vehicles for regulating the distance in relation to a vehicle travelling ahead (known by the applicant under the term "Distronic"), a speed regulating device (cruise controller), a collision avoidance device that, for example detects oncoming vehicles during overtaking maneuvers, a tire pressure monitoring system, a curve warning device for issuing prompt warnings of curves when the longitudinal velocity of a vehicle is too high, which device may also bring about braking and/or steering interventions in a further expansion level in order to prevent a vehicle from travelling through a curve at an unacceptably high speed, or any other driving system device which can be made available to the driver as an aid.

Such driving system devices may, on the one hand, merely have a warning function in order to draw the driver's attention to a specific driving state, for example if the tire pressure is not in a permitted range. However, there is also the possibility that the driving system devices automatically influence the driving state, for example, by means of a steering or braking intervention, without a manual intervention of the driver. For example, in some vehicles, it is already possible to provide a device for regulating the distance between vehicles, which automatically brakes the vehicle when the distance from the vehicle travelling ahead is too short. If a plurality of driving system devices are then to be integrated in one vehicle, it is necessary to ensure that any access to the actuator devices of the vehicle—for example the brake device or steering device—which are triggered by various driving system devices, both ensure safe driving and make it possible to maintain the correct functions of the various driving system devices.

Taking this as a starting point, the present invention is based on the object of providing a method, and a device for carrying out the method, which permits a plurality of driving system devices to be integrated in one vehicle while ensuring a safe driving state.

This object is achieved by providing a method and device for coordinating a plurality of driving system devices of a vehicle, a control result signal being generated from output signals of the driving system devices which are brought about as a function of current driving state variables of the vehicle and are used as a predefined setpoint value for influencing the driving state by means of at least one actuator device of the vehicle and/or a parameter result signal for influencing the regulating and/or control parameters of a driving state regulator or controller. When the control result signal and/or the parameter result signal is determined, a plurality of output signals which are present are then prioritized and/or weighted if these output signals originate from different driving system devices. The driving system devices are divided into a plurality of groups with different group priorities. The output signals of the driving system devices of a group with higher group priority are more heavily weighted during the determination of the control result signal and/or of the parameter result signal than the output signals of the driving system devices of a group with lower group priority.

The driving system devices which are provided in the vehicle generate output signals as a function of respectively determined driving state variables. The output variables constitute request signals for influencing the driving state or the regulation or control of the driving state. They are fed to a coordination device. This generates a control result signal and/or a parameter result signal as a function of the output signals which are present simultaneously. The control result signal is used as a predefined setpoint value for influencing the current driving state or the current movement of the vehicle. The respective actuator devices of the vehicle are activated as a function of the control result signal in order to bring about the desired movement of the vehicle or the desired driving state. The control parameters or regulating parameters for controlling or regulating the driving state, for example threshold values or parameters which characterize the vehicle, can be changed as a function of the parameter result signal so that it is possible to control or regulate the driving state in a way which can be adapted to the current driving state. The simultaneous uncoordinated access of the driving system devices to the actuator devices or the blocking of an access request of a driving system device merely because of the presence of an earlier access request to the same parameters or the same actuator devices is ruled out in the method according to the invention and the device according to the invention.

The driving system devices can also be simultaneously coordinated in terms of the feedback sent to the driver in order to inform him about the driving state. This is the subject-matter of a patent application submitted by the applicant on the same day, with the title "Verfahren und Vorrichtung zur Rückmeldung des Fahrzustandes eines Fahrzeugs an den Fahrer (Method and device for providing the driver with feedback on the driving state of a vehicle)" (applicants internal file No. P033161/DE/1), the specification of which is incorporated by reference herein.

Advantageous refinements of the method and of the device according to the invention emerge from the respective dependent claims.

The control result signal expediently corresponds to the setpoint driving state of the vehicle. The control result signal describes the setpoint movement of the vehicle in three-dimensional space. The control result signal thus defines the entire desired spatial movement of the vehicle.

Alternatively, it is also possible for the control result signal to correspond to the setpoint change in the driving state for the vehicle, in which case the control result signal describes the setpoint change in the movement of the vehicle in three-dimensional space. Here, only the desired change in movement of the vehicle is predefined as the setpoint value. The change in movement is defined for all the directions of movement in three-dimensional space.

In order to actuate the respective actuator devices, the control result signal can be transmitted directly to these actuator devices in order to influence the movement of the vehicle. It is possible here to superimpose a separate regulating operation for the dynamics of vehicle movement, which can be carried out in a known fashion by a driving state regulator or controller (for example ESP regulator) which is customary nowadays.

In another embodiment, the control result signal is transmitted to a driving state regulator or controller, in particular a regulator for the dynamics of vehicle movement, which produces actuation signals for the actuator devices in order to influence the movement of the vehicle. Thus, just one indirect transmission of the control result signal to the actuator devices is provided. The driving state regulator or controller evaluates the control result signal to determine whether there is a sufficiently stable overall driving state when the actuator device is actuated in accordance with the control result signal, and only generates, as a function of the evaluation result, actuation signals for the actuator devices which ensure an overall stable driving behavior. The driving state regulator or controller is therefore used, even before the actuation of the actuator devices, to check whether an unstable driving state could occur as a result of the actuation provided according to the control result signal, the actuator devices being then actuated in a correspondingly corrective fashion by the actuation signals.

It is also advantageous if the parameter result signal is transmitted to a driving state regulator or controller, in particular a regulator for the dynamics of vehicle movement, in order to influence the control parameters or regulating parameters of the driving state regulator or controller. The parameter result signal does not directly influence the actuation of the actuator devices, and thus the movement of the vehicle, but instead serves to change the regulating behavior or control behavior of the driving state regulator or controller by varying the regulating parameters or control parameters such as, for example, the triggering threshold or other parameters which characterize the driving behavior of the vehicle. In this way, adaptive regulation or control can be implemented.

During the determination of the control result signal and/or of the parameter result signal, it is possible for a plurality of output signals which are present to be prioritized and/or weighted if these output signals originate from different driving system devices. This measure makes it possible to coordinate a plurality of access requirements, present simultaneously, of a plurality of driving system devices with these actuator devices or the same parameters. The control result signal and the parameter result signal take into account here the importance of the output signals which are present for driving safety, weighting or prioritization being carried out in accordance with the evaluation of the importance of the output signals with respect to the instantaneous driving state of the vehicle.

In order to make possible a safer driving state of the vehicle, it is possible, when determining the control result signal and/or the parameter result signal, to take into account additional sensor signals which contain information relating to the current driving state of the vehicle, and/or input signals which correspond to manual predefined values of the driver. The output signals can then be prioritized or weighted taking into account the additional information of the sensor signals or of the input signals. The information from the additional input signals and sensor signals is used as evaluation criteria for the weighting and/or prioritization of the output signals in the determination of the two result signals. The sensor signals can contain, for example, current data relating to the yaw angle speed and/or the acceleration of the vehicle and/or the velocity of the vehicle and/or the wheel speeds and/or the steering wheel torque and/or the steering wheel angle. Of course, the acceleration of the vehicle or the velocity of the vehicle can be a three-dimensional vector variable in order to be able to specify the velocity or the acceleration in all the directions of movement of the vehicle, for example by reference to a Cartesian coordinate system which is usually used in vehicles and is fixed to the vehicle.

In order to determine the weighting of the various output signals, the driving system devices can be divided into a plurality of groups with different group priorities, the output signals of the driving system devices of one group with a higher group priority being more heavily weighted during the determination of the control result signal and/or the parameter result signal than the output signals of the driving system devices of a group with lower group priority. Here it is, for example, possible to assign the driving system devices which request an automatic safety intervention to a group with a high group priority, and the driving system devices which serve only to warn the driver to a group with a low group priority.

The output signals of the driving system devices are expediently present in the form of control signals for requesting an application of signals to actuator devices, or parameter signals for requesting that the regulating parameters and/or control parameters of the driving state regulating or controlling system should be influenced. The control result signal is determined as a function of the control signals, and the parameter result signal is determined as a function of the parameter signals.

One possible way of determining the control result signal or the parameter result signal is to form the sum of the control signals or parameter signals of the driving system devices which are each weighted with a weighting factor, in particular the sum of the individual weighting factors being equal to one, and the weighting factors being able to assume values in the region from zero to one. If a pure priority evaluation of the output signals which are present is to take place, it is possible, when evaluating the two output signals, to make in each case one weighting factor equal to one and all the other weighting factors equal to zero.

The weighting factors of the output signals can be predefined as a function of a driving system priority which is assigned to the respective driving system device. Different driving system priorities can be allocated with respect to the driving system devices of the same group of driving system devices, or with respect to all the driving system devices which are present.

In one variant which is easy to implement in order to determine the control result signal or the parameter result signal, only the output signals of the driving system devices of a single group are taken into account. Here, in particular, the group priorities of the groups of driving system devices whose driving system devices have produced output signals at the calculation time can be compared. The output signals of the driving system devices from the group of driving system devices with the comparatively highest group priority are then used to determine the two result signals.

In one expedient embodiment of the device according to the invention, the coordination device is integrated in a central processor unit together with the driving system devices and/or the driving state regulator or controller. The entire device requires little space and is better protected against interference, for example against external electromagnetic fields, owing to the short electrical connections between the components.

Furthermore, it is advantageous if the coordination device is connected to a sensor arrangement and/or an operator control arrangement so that the sensor signals, which are generated by the sensor arrangement and contain information relating to the current driving state of the vehicle, and/or the input signals of the operator control arrangement, which correspond to manual settings of the driver, can be transmitted to the coordination device in order to be taken into account in the determination of the control result signal and/or of the parameter result signal. At the same time, the coordination device receives additional information and data of the sensor arrangement, relating to the current driving state of the vehicle, independently of the output signals of the driving system devices. In this way, it is possible to ensure that the stability of the driving state is further improved as more information is made available to the coordination device than to the individual driving system devices.

In order to avoid additional or redundant sensors, it is possible here for one or more of the sensors of the sensor arrangement also to be used as a sensor for one or more of the driving system devices.

The method and device according to the invention will be explained in more detail below with reference to the appended drawing.

BRIEF DESCRIPTION OF THE DRAWINGS

The single FIGURE shows a block circuit diagram of an embodiment of the device according to the invention.

DETAILED DESCRIPTION OF THE DRAWINGS

The FIGURE is a block diagram of the device 5 according to the invention, which is used to coordinate a plurality of driving system devices 6 in a vehicle (not illustrated in more detail), in particular a motor vehicle or passenger car. The number of driving system devices 6 which are present can basically be selected as desired and depends on the equipment level of the vehicle.

The driving system devices 6 are divided, by way of example, into safety devices, comfort devices and warning system devices and could also be referred to as driver aids. They are provided for supporting the driver in specific driving states or driving situations of the vehicle.

The safety system device which is provided in the exemplary embodiment is formed by a braking/steering aid 7 (referred to as "Advanced Brake Assist") which can carry out braking and steering interventions automatically as a function of obstacles detected on the carriageway, in order to avoid a collision with the obstacle. Furthermore, a curve safety device ("Intelligent Predictive System") is possible as a safety system device, said curve safety system detecting curves in advance by means of GPS and, if appropriate, adapting the velocity of the vehicle to the radius of the curve in good time before the curve by means of a braking intervention in order to prevent unstable driving states of the vehicle when travelling through a curve.

The comfort system device which is present by way of example is implemented as a device 8 for regulating the distance between vehicles (known as "Distronic" by the applicant), which performs braking interventions as a function of the distance from a vehicle travelling ahead, in order to maintain a predefined safety distance from said vehicle. A comfort system device could also be a driving system device 6, referred to as "Staumatic" which permits the vehicle to drive autonomously in congested traffic with steering and braking taking place automatically.

The warning system device provided according to the figure is a tire pressure warning device 9 which warns the driver audibly and/or visually and/or haptically of an excessively low or excessively high air pressure in one of the tires of the vehicle. Instead of, or in addition to, the tire pressure warning device 9, a hazard warning device could also be provided which warns the driver of curves, intersections with poor visibility or the like if the longitudinal velocity of the vehicle is not adapted to the respective hazardous location. The hazardous location can be detected in advance by means of GPS, for example.

Furthermore, further safety, comfort and warning system devices are known which, in a departure from the illustrated exemplary embodiment, can be provided in the vehicle as a driving system device 6, in any desired number and in any desired combination.

The driving system devices 6 each have one or more sensors 10 which are only illustrated schematically in the figure. The braking-steering aid 7 has, for example, at least one radar sensor 11 for detecting obstacles in the surroundings of the vehicle. The device 8 for regulating the distance between vehicles has a radar sensor 12a for determining the distance from the vehicle travelling ahead, and a vehicle longitudinal velocity sensor 12b. The tire pressure warning device 10 contains a plurality of tire pressure sensors 13 for measuring the pressure in each of the tires of the vehicle.

The driving system devices 6 also each have a driving system controller 14 or 15 or 16 which is connected to a coordination device 18 via a first electrical conductor arrangement 19. Here, each driving system controller 14, 15, 16 can be connected separately to the coordination device 18, or the first conductor arrangement 19 can be embodied as a bus system via which the driving system devices 6 and the coordination device 18 can communicate.

A driving state regulator or controller 22, which is formed for example by a regulator 23 for the dynamics of vehicle movement, is electrically connected to the coordination device 18. For example, the ESP regulator which is already present in the vehicles of the applicant is possible as a regulator 23 for the dynamics of vehicle movement.

The coordination device 18 can be integrated in a central processor unit 24 together with the driving state regulator or controller 22 and/or the driving system controllers 14, 15, 16 of the driving system devices 6. According to the figure, in the preferred exemplary embodiment the coordination device 18, the driving state regulator or controller 22, embodied as a regulator 23 for the dynamics of vehicle movement, and the driving system controllers 14, 15, 16 are combined as one assembly in the central processor unit 24, which is illustrated schematically by a dashed line.

The vehicle can have a plurality of actuator devices 26 for influencing the movement of the vehicle in the longitudinal direction (x direction), in the transverse direction (y direction) and in the vertical direction (z direction) of the vehicle. In the exemplary embodiment, according to the figure the actuator devices 26 which can be actuated are formed by the brake device 27, the steering device 28 and an engine control device 29. The brake device 27, steering device 28 and engine control device 29 are connected to the regulator 23 for the dynamics of vehicle movement for communicating by means of a second electrical conductor arrangement 30.

Of course, the actuator devices 26 can also have an active spring damper device, a gearbox control device or the like. Here, combinations of any desired actuator devices 26 which can be actuated are possible in any desired number.

In order to determine current driving state information, a sensor arrangement 34 is provided which is connected, by way of example, to the coordination device 18 and to the regulator 23 for the dynamics of vehicle movement via a third electrical conductor arrangement 35. The sensor arrangement 34 comprises sensors for determining the yaw angle rate, the longitudinal velocity of the vehicle, the longitudinal acceleration of the vehicle, the transverse acceleration of the vehicle, the wheel speeds and the steering torque.

Basically, any desired driving state information which is required by the coordination device 18 and/or the regulator 23 for the dynamics of vehicle movement can be determined by means of the sensor arrangement 34. For example, it is also possible to determine the acceleration of the vehicle in the z direction (direction of the vertical axis of the vehicle), the steering wheel angle, the transverse velocity of the vehicle or the velocity of the vehicle in the z direction in the sensor arrangement 34 and transmit it to the coordination device 18 and the regulator 23 for the dynamics of vehicle movement as information relating to the instantaneous driving state of the vehicle.

The sensors of the sensor arrangement 34 can also be at least partially used as sensors 10 for the driving system devices 6, or vice versa, if redundancy is not desired for safety reasons. For example, the vehicle longitudinal-velocity sensor 12b of the device 8 for regulating the distance between vehicles can at the same time also be used as a sensor of the sensor arrangement 34.

According to the figure, there is also an operator control arrangement 36, which is used to manually predefine driving parameters. The driver can influence, as driving parameters, for example the steering behavior (degree of directness of the steering, steering transmission ratio), the pedal characteristics, the control of the engine etc., in order to be able to select a sporty, comfortable or other vehicle configuration variant. The driver can be provided here with a selection between various modes, such as "sporty", "comfort", "standard", etc. in order to set the overall characteristics of the vehicle. The operator control arrangement 36 is electrically connected to the coordination device 18 and transmits input signals to the coordination device 18.

It is to be noted at this point that, instead of the electrical conductor arrangements 19, 30, 35, it is also possible, in a modification with respect to the preferred exemplary embodiment, also to provide an optical waveguide arrangement, for example by means of optical fibre waveguides. Any other different transmission-arrangement between the devices connected by the conductor/waveguide arrangements provided is basically possible.

The driving system devices 6 generate output signals as a function of the driving state variables determined by the sensors 10 of the respective driving system device 6. The driving state variables determined by the various driving system devices 6 depend on the specific function of the respective driving system device 6, each driving system device 6 being assigned only a partial safety aspect of the overall driving state of the vehicle for monitoring, controlling or regulating. For example, the device 8 for regulating the distance between vehicles can determine the distance from the vehicle travelling ahead and the relative speed of the two vehicles. The tire pressure warning device determines the air pressure in all the tires of the vehicle, and the braking/steering aid 7 determines the position of obstacles and of the relative velocity of the vehicle relative to the detected obstacles. If one of the driving system devices 6 determines a driving state variable which is not in a correspondingly acceptable range, the respective driving system device 6 generates an output signal in order to return this driving state variable to an acceptable value range or to take into account this driving state variable during regulating interventions of the driving state regulating system so that a stable driving state can be ensured.

These output signals are present in the form of a control signal and/or of a parameter signal. Both the parameter signal and the control signal include an access request to one or more parameters or to one or more actuator devices 26 and also include the values which are to be assigned to the parameters or the values to be applied to the respective actuator devices 26.

The output signals which are present as control signals contain information for influencing the movement of the vehicle by means of an intervention of one or more actuator devices 26. For example, a driving system device 6 can request, by means of a corresponding control signal, that a signal be applied to the braking device 27 in order to reduce the longitudinal velocity of the vehicle, or by means of a control signal it is possible to request that a signal is applied to the steering device in order to set a specific steering angle. Basically, the control signals of the driving system devices 6 can be assigned to any available actuator device 26 of the vehicle and request a specific application of a signal, or a specific intervention of the actuator devices 26.

The output signals which are present as parameter signals constitute, for example, a change request of the regulating parameters of the regulator 23 for the dynamics of vehicle movement in order to adapt the regulation of the state of the dynamics of vehicle movement to the currently present driving or vehicle conditions. A parameter signal can be brought about if a driving state variable which is determined by one of the driving system devices 6 does not lie within a predefinable acceptable value range. In the exemplary embodiment, a change request for changing the regulating parameters of the regulator 23 for the dynamics of vehicle movement may be present in the form of a corresponding parameter signal of the tire pressure warning device if, for example, an excessively low or an excessively high tire pressure has been detected in one of the tires, or a large difference in tire pressure has been detected in two tires. This adversely affects the driving behavior of the vehicle so that the pressure warning device requests that the parameters of the regulator 23 for the dynamics of vehicle movement be adapted for the regulating intervention. Any other parameter signals of other driving system devices 6 are also possible and depend on the individual case.

The output signals are transmitted to the coordination device 18 by means of the first conductor arrangement 19. The coordination device 18 is used to evaluate the output signals which are brought about by the driving system devices 6, and to generate a control result signal or a parameter result signal.

According to the preferred embodiment, the control result signal and the parameter result signal are transmitted to the regulator 23 for the dynamics of vehicle movement by the coordination device 18, the regulator 23 for the dynamics of vehicle movement producing actuation signals for the actuator devices 26 as a function of the control result signal. The control result signal can either correspond to the setpoint driving state and define the desired movement of the vehicle in three-dimensional space or it can correspond to the setpoint change in the driving state and thus define the desired change in the movement of the vehicle in three-dimensional space.

However, when the actuator devices 26 are provided with signals by the regulator 23 for the dynamics of vehicle movement as a function of the setpoint driving state or of the setpoint change in the driving state—each predefined by the control result signal—the regulation of the dynamics of vehicle movement is taken into account in such a way that the actuation signals for the actuator devices 26 each already include the applications of signals requested by the regulator 23 for the dynamics of vehicle movement. Consequently, the actuation signals are formed from the control result signal and from the regulator 23 for the dynamics of vehicle movement during the evaluation of the control event signal as a function of correction signals which is determined from the driving state of the vehicle.

There are, therefore, basically two cases to be distinguished. The actuation signals can either correspond to the control result signal if there is a stable state of the dynamics of vehicle movement, and therefore no correction of the control result signal by the regulator 23 for the dynamics of vehicle movement is necessary (correction signals of the regulator 23 for the dynamics of vehicle movement are equal to zero). Otherwise, when an unstable driving state is detected by the regulator 23 for the dynamics of vehicle movement, the actuation signals are formed from the superimposition of the determined correction signals on the control result signal.

The regulator 23 for the dynamics of vehicle movement is used here, as it were, as an observer which is superordinate to the individual driving system devices 6. The regulator 23 for the dynamics of vehicle movement evaluates the driving state of the vehicle globally here, while the driving system devices 6 evaluate only specific driving state variables which serve as a measure of a specific partial aspect, such as a safety distance from the vehicle travelling ahead or a satisfactory tire pressure, of the overall driving state of the vehicle.

The monitoring function of the regulator 23 for the dynamics of vehicle movement can at least also be, to a certain extent, already implemented in the coordination device 18 as, according to the figure, the latter is also connected to the sensor arrangement 34, and can evaluate the sensor signals. The coordination device 18 is therefore provided with sufficient information on the driving state of the vehicle.

In addition to the control result signal, the coordination device 18 also produces the parameter result signal if there is also at least one parameter signal as an output signal of one of the driving system devices 6. The parameter result signal brings about a change in the regulating parameters of the regulator 23 for the dynamics of vehicle movement.

This change in the regulating parameters of the regulator 23 for the dynamics of vehicle movement is provided for adaptation to the current driving state of the vehicle, for example to a reduced tire pressure. Basically, all the variable regulating parameters of the regulator 23 for the dynamics of vehicle movement can be changed by means of the parameter result signal. Those parameters which have a perceptible influence on the driving state and which can be changed during the operation of the vehicle, for example the tire pressure or the spring damper characteristic of a spring damper device (not illustrated in more detail) are provided as variable regulating parameters.

As an alternative to the embodiment described above, it is also possible to transmit the control result signal directly from the coordination device 18 to the actuator devices 26 using a fourth electrical conductor arrangement 38 which is illustrated by dot-dashed lines in the figure. The fourth conductor arrangement can, like the other conductor arrangements 19, 30 and 35, also be embodied as a bus or in the form of a plurality of individual connections, as an electrical or optical transmission link.

The control result signal is determined as a function of the control signals, present at the calculation time, of the driving system devices 6, and determines the parameter result signal as a function of the parameter signals, present at the calculation time, of the driving system devices 6 in the coordination device 18.

If only one control signal or parameter signal of one of the driving system devices 6 is present, the control result signal or the parameter result signal corresponds to this control signal or parameter signal. It is necessary to weight and/or prioritize the simultaneously present output signals only if these output signals originate from different driving system devices 6.

If, at the same time, the access request of a plurality of driving system devices 6 to the same actuator device 26 is present with different signal-application values (a plurality of colliding control signals), the control signals are, for example, weighted. For example, the device 8 for regulating the distance between vehicles can request a braking operation with only a small braking force in order to correct the distance from the vehicle travelling ahead, while the braking/steering aid 7 requests a braking operation with the maximum possible braking force owing to a detected obstacle on the roadway. The coordination device 18 must evaluate the different control signals and form a control result signal, for an appropriate application of signals to the braking device 27.

Furthermore, it may be necessary to weight and/or prioritize the output signals if there are control signals from different driving system devices 6 which request the application of signals to different actuator devices 26. This is the case if a simultaneous application of signals to different actuator devices 6 with the application values in accordance with the control signals would lead to an unstable driving state of the vehicle. It is possible, for example, for the braking/steering aid 7 to request a large steering angle in order to avoid an obstacle, while the device 8 for regulating the distance between vehicles requests a braking operation with a maximum braking force owing to another vehicle appearing in front of the vehicle. In this case also, the control signals must be prioritized and/or weighted in order to maintain the stable driving state.

Although a single control signal of a single driving system device 6 can request that signals be applied to different actuator devices 26, the respective application values are already matched to one another so that a further evaluation can be omitted here.

A collision of parameter signals can occur, in a similar way to the collisions of the control signals described above, if, for example, the parameter signals for different driving system devices 6 request correction of the same regulating parameters of the regulator 23 for the dynamics of vehicle movement or if the change requests relate to different regulating parameters, but as a result an unstable driving state could arise because the regulating parameters would no longer be matched to one another after the requested change. Such collisions are avoided by the prioritization or weighting of the parameter signals, as is also true for the control signals.

For example, the determination of the control result signal in the coordination device 18 is carried out by the formation of the sum of the weighted control signals of the driving system devices 6 in accordance with the formula:

$$s_{ERG} = \sum_{j=1}^{n} k_i \cdot s_i,$$

where $S_{ERG}$ is the control result signal, n is the number of driving system devices 6 present, $k_i$ is the weighting factors with $k_i \in [0;1]$ and $$\sum_{j=1}^{n} k_i = 1,$$

and $S_1$ are the control signals of the driving system devices 6.

If there is no control signal from a driving system device 6, the corresponding value of $S_i=0$.

The parameter result signal is also determined in a similar way to the calculation of the control result signal:

$$p_{ERG} = \sum_{j=1}^{n} k_i \cdot p_i,$$

where $P_{ERG}$ is the parameter result signal n is the number of driving system devices 6 present, $k_i$ is the weighting factors with $k_i \in [0;1]$ and $$\sum_{j=1}^{n} k_i = 1,$$

and $P_i$ are the parameter signals of the driving system devices 6.

If there is no parameter signal from a driving system device 6, the corresponding value of $P_i=0$.

In order to prioritize the output signals during the determination of a control signal or result signal, it is possible to divide the driving system devices 6 into groups, the various groups of driving system devices 6 being assigned different group priorities. The output signals of the driving system devices 6 of one group of driving system devices with a high group priority are more heavily weighted during the determination of the two result signals than the output signals which originate from driving system devices 6 of a group of driving system devices with a low group priority.

The number of groups of driving system devices which are formed can theoretically be selected as desired. For example, the driving system devices 6 are divided into three groups: a safety system device group, to which all the safety-related driving system devices 6 are assigned, a comfort system device group, to which the driving system devices 6 relating only to the comfort of the vehicle are assigned, and a warning system device group to which the driving system devices 6 are assigned which do not request an application of signals to the actuator devices 26 which influence the movement of the vehicle but rather which warn the driver about a current unacceptable driving state and, if appropriate, request that the regulating parameters be adapted to this driving state using parameter signals. The safety system devices can be assigned the highest group priority here and the warning devices the lowest group priority. In a modification of this, a different division of the driving system devices 6 into different groups can also be carried out, or a different assignment of priorities is possible.

Both when determining the control result signal and when calculating the parameter result signal it is possible to take into account only the output signals of the driving system devices 6 which belong to a common group of driving system devices. In a preferred configuration of the method, the group priority of the groups of driving system devices whose driving system devices have generated at least a control signal which is unequal to zero are compared, and during the determination of the control result signal only the control signals which are assigned to the driving system devices 6 of the group with the comparatively highest group priority are taken into account. The determination of the parameter result signal as a function of the parameter signals of the driving system devices 6 can be carried out with a corresponding application of the determination of the control result signal.

In combination with, or alternatively to, the group priorities it is possible to assign driving system priorities to the driving system devices 6. As already explained with respect to the group priorities, the driving system priorities are also used to weight the output signals of the driving system devices 6 differently as a function of the driving system priority during the determination of the control result signal and of the parameter result signal. In the process, it is possible to allocate different driving system priorities to the driving system devices 6 of a common group of driving system devices. If the driving system devices 6 are not divided into various groups, each individual driving system device 6 can be assigned a driving system priority. The output signals of the driving system devices 6 with the same driving system priority are given equal weighting during the calculation of the parameter result signal or of the control result signal.

In addition, there is provision, for example, for the coordination device 18 to take into account further information in determining the two result signals. This information is received by the coordination device 18 in the present case in the form of sensor signals of the sensor arrangement 34 and in the form of input signals of the operator control arrangement 36. The information from the input signals and the sensor signals can be used as additional evaluation criteria when determining the weighting factors. However, they can also be included directly in the calculation of the control result signal and/or of the parameter result signal by means of the coordination device 18, and therefore treated by the coordination device 18 as an output signal of the driving system devices 6.

The characteristics of the vehicle selected by the driver at a given time and the resulting setting values of the vehicle devices such as the steering device 28, braking device 27, engine control device 29 etc. can be determined from the input signals of the operator control arrangement 34 in the coordination device 18. For example, specifically it is possible to set the "steering transmission ratio" which can be set in a variable fashion on an electronic steering device or the degree of damping, set at a given time, of a spring damper device (not illustrated in more detail). As these setting values influence the driving behavior of the vehicle, they need to be known in the evaluation of the driving state (stability or instability). Therefore, to maintain or regain a stable driving state, specific output signals can be weighted more heavily or less heavily while taking into account the setting values of the vehicle devices which are influenced manually by the driver by means of the operator control arrangement.

The sensor signals of the sensor arrangement 34 contain information on the overall driving state of the vehicle. In order to maintain its stability, or bring about its stability, for example the output signals are weighted during the determination of the control result signal or of the parameter result signal as a function of the sensor signals of the sensor arrangement 34. Which of the output signals has stronger weighting and which has less strong weighting depends on the individual case, that is to say on the driving state which is specifically present. The coordination device 18 can, like the regulator 23 for the dynamics of vehicle movement, also serve as an observer which is superordinate to the driving system devices 6, in order to coordinate the individual access requests of the driving system devices 6 in order to bring about a stable overall driving state.

If the coordination device 18 has detected an excessively high yaw angle rate, for example by means of the sensor signals of the sensor arrangement 34, and if the braking/steering aid requests that a steering angle which would increase even more the already detected unacceptable yaw behavior should be applied to the steering device 28, the respective control signal of the braking/steering aid is not taken into account in the calculation of the control result signal, or only taken into account with a small weighting factor (weighting factor $k_i=0$). Of course, any other examples of situations are conceivable.

What is claimed is:

1. A method for coordinating a plurality of driving system devices of a vehicle, which plurality of driving system devices generate output signals as a function of current driving state variables, wherein at least one of a control result signal used as a predefined setpoint value for influencing a driving state via at least one actuator and a parameter result signal used for influencing at least one of regulating and control parameters of a driving state regulator or controller are generated from the output signals, the method comprising the acts of:

when at least one of the control result and the parameter result signal is determined, a plurality of output signals present are at least one of prioritized and weighted if said output signals originate from different ones of the plurality of driving system devices, wherein the driving system devices are divided into a plurality of groups with different group priorities; and prioritizing or weighting more heavily the output signals of the driving system devices of a group having a higher group priority during the determination of the at least one of the control result signal and parameter result signal than the output signals of the driving system devices of a group having a lower group priority.

2. A method according to claim 1, wherein the driving system devices are divided into groups in terms of their function.

3. A method according to claim 1, wherein the driving system devices are divided into three groups:
(1) a safety system device group, to which all safety-related driving system devices are assigned,
(2) a comfort system device group, to which the driving system devices relating only to comfort of a driver are assigned, and
(3) a warning system device group, to which the driving system devices are assigned which do not request an application of signals to the actuator device that influences movement of the vehicle, but rather which warn the driver of a current unacceptable driving state and, if appropriate, request an adaptation of regulating parameters to this driving state using parameter signals.

4. Method according to claim 1, wherein the control result signal corresponds to the setpoint driving state of the vehicle, the control result signal describing the setpoint movement of the vehicle in three-dimensional space.

5. Method according to claim 1, wherein the control result signal corresponds to the setpoint driving state change for the vehicle, the control result signal describing the setpoint change in the movement of the vehicle in three-dimensional space.

6. Method according to claim 1, wherein the control result signal is transmitted directly to the actuator device in order to influence the movement of the vehicle.

7. Method according to claim 1, wherein the control result signal is transmitted to one of a driving state regulator and a controller for the dynamics of vehicle movement, which brings about actuating signals for the actuator devices in order to influence the movement of the vehicle.

8. A method according to claim 1, wherein the parameter result signal is transmitted to one of a driving state regulator and a controller for the dynamics of vehicle movement in order to influence its control parameters or regulating parameters.

9. Method according to claim 1, wherein during a determination of the at least one of the control result signal and the parameter result signal, at least one of sensor signals, which contain information on the current driving state of the vehicle, and input signals, which correspond to manual settings of the driver, are taken into account.

10. Method according to claim 9, wherein during the determination of the at least one of the control result signal and the parameter result signal, the output signals are weighted as a function of the sensor signals.

11. Method according to claim 9, wherein the sensor signals contain information on at least one of a yaw angle rate, acceleration of the vehicle, a velocity of the vehicle, wheel speeds, a steering wheel torque, and a steering wheel angle.

12. Method according to claim 1 wherein the output signals of the driving system devices are present in the form of one of control signals and parameter signals, the control result signal being determined as a function of the control signals, and the parameter result signal being determined as a function of the parameter signals.

13. Method according to claim 12, wherein during the determination of the at least one of the control result signal and the parameter result signal, only the output signals of the driving system devices of a single group of driving system devices are taken into account.

14. Method according to claim 1, wherein the at least one of the control result signal and the parameter result signal is formed from a sum of the respective output signals for the driving system devices which are each weighted with a weighting factor, in particular the sum of the individual weighting factors being equal to one, and the weighting factors being able to assume values in the range from zero to one.

15. Method according to claim 14, wherein the weighting factors of the output signals are predefinable as a function of a driving system priority assigned to the respective driving system device.

16. Method according to claim 15, wherein during the determination of the at least one of the control result signal and the parameter result signal, only the output signals of the driving system devices of a single group of driving system devices are taken into account.

17. Method according to claim 14, wherein during the determination of the at least one of the control result signal and the parameter result signal, only the output signals of the driving system devices of a single group of driving system devices are taken into account.

18. Device for coordinating a plurality of driving system devices of a vehicle, comprising:
a coordination device generating, from output signals of the driving system devices produced as a function of current driving state variables, at least one of a control result signal and a parameter result signal said coordination device being connected to actuator devices of the vehicle in order to influence a driving state, said control result signal being used as a predefined setpoint value for influencing the driving state via at least one actuator device of the vehicle, and said parameter result signal being used to influence at least one of the regulating ane control parameters of a regulation or control of the driving state, a plurality of output signals which are present being at least one of prioritized and weighted during the determination of the at least one of the control result signal and the parameter result signal if these output signals originate from different driving system devices,
wherein the driving system devices are divided into a plurality of groups with different group priorities, the output signals of the driving system devices of a group with a higher group priority being weighted more heavily during the determination of the control result signal and/or the parameter result signal than the output signals of the driving system devices of a group with lower group priority.

19. Device according to claim 18, wherein the driving system devices are divided into groups in terms of their function.

20. Device according to claim 18, wherein the driving system devices are divided into three groups:
(1) a safety system device group, to which all safety-related driving system devices are assigned,
(2) a comfort system device group, to which the driving system devices which only relate to the comfort of the driver are assigned, and
(3) a warning system device group, to which the driving system devices are assigned which do not request any application of signals to the actuator devices which influence the movement of te vehicle, but rather which warn the driver about a current unacceptable driving state and, if appropriate, request an adaptation of the regulating parameters to this driving state using parameter signals.

21. Device according to claim 18, wherein the coordination device is indirectly connected to the actuator devices in order to transmit the control result signal to the actuator devices.

22. Device according to claim 18, wherein the coordination device is connected to a driving state regulator or controller, in particular a regulator for the dynamics of vehicle movement in order to transmit the at least one of the control result signal and the parameter result signal, said regulator for the dynamics of vehicle movement being connected to the actuator devices in order to at least one of control and regulate the movement of the vehicle as a function of the control result signal.

23. Device according to claim 22, wherein in that the driving state regulator or controller and the coordination device are integrated in a central processor unit.

24. Device according to claim 23, wherein the driving system devices have driving system controllers which are integrated with the coordination device in a central processor unit.

25. Device according to claim 22, wherein the driving system devices have driving system controllers which are integrated with the coordination device in a central processor unit.

26. Device according to claim 25, wherein the driving system controllers, the driving state regulator or controller and the coordination device are integrated in a central processor unit.

27. Device according to claim 18, wherein the driving system devices have driving system controllers which are integrated with the coordination device in a central processor unit.

28. Device according to claim 27, wherein the driving system controllers, the driving state regulator or controller and the coordination device are integrated in a central processor unit.

29. Device according to claim 18, wherein the coordination device is connected to at least one of a sensor arrangement and an operator control arrangement so that at least one of sensor signals which are generated by the sensor arrangement and contain information relating to the current driving state of the vehicle and input signals of the operator control arrangement which correspond to manual settings of the driver can be transmitted to the coordination device in order to be taken into account in the determination of the at least one of the control result signal and the parameter result signal.

30. Device according to claim 29, wherein during the determination of the at least one of the control result signal and the parameter result signal, the output signals are weighted as a function of the sensor signals.

31. Device according to claim 29, wherein the sensor arrangement has at least one sensor whose sensor signal is used simultaneously by one of the driving system devices.

32. A method for coordinating a plurality of driving system devices of a vehicle, which driving system devices generate output signals as a function of current driving state variables, to produce a result signal usable as at least one of a predefined setpoint value for influencing a driving state and for influencing regulation/control parameters of a driving state regulator/controller, the method comprising the acts of:

dividing the plurality of driving system devices into a plurality of groups having different group priorities; and weighting the output signals of the driving system devices of a group having a higher group priority more heavily during a determination of the result signal than the output signals of the driving system devices of a group having a lower priority.

33. The method according to claim 32, wherein the result signal is one of a control result signal and a parameter result signal.

* * * * *